UNITED STATES PATENT OFFICE.

FREDERICK RICHARD BACHLER, OF LOS ANGELES, CALIFORNIA, ASSIGNOR TO KIESELGUHR COMPANY OF AMERICA, OF LOS ANGELES, CALIFORNIA, A CORPORATION OF CALIFORNIA.

METHOD FOR DECOLORIZING LIQUIDS.

1,131,308.  Specification of Letters Patent.  Patented Mar. 9, 1915.

No Drawing.  Application filed September 20, 1913.  Serial No. 790,938.

*To all whom it may concern:*

Be it known that I, FREDERICK RICHARD BACHLER, a subject of the Emperor of Austria-Hungary, residing at Los Angeles, in the county of Los Angeles and State of California, have invented a new and useful Method for Decolorizing Fluids, of which the following is a specification.

The main object of my invention is to provide for economical and effective decolorization of sugar juices and solutions, or of fats, oils, or other liquids which can be decolorized by oxidation. Hydrogen dioxid is an extremely powerful decolorizing agent for such purposes, but on account of its rapidity of action it is difficult to introduce it into the liquid to be decolorized in such manner as to produce uniform and effective decolorization throughout the liquid. Thus, if hydrogen dioxid solution be introduced bodily into sugar juice, there is violent reaction at the parts in contact, with the result that the oxygen is freed and expended too quickly, and a large proportion of the hydrogen dioxid is lost before it reaches any considerable part of the sugar. In order to utilize the hydrogen dioxid to the fullest extent, and at the same time provide for effective and uniform decolorization of the sugar juice, or other liquid being treated, I cause the hydrogen dioxid to be absorbed in a porous solid, namely, kieselguhr or diatomaceous earth, and mix this composition of kieselguhr and hydrogen dioxid with the liquid to be treated, with the result that the hydrogen dioxid is disseminated throughout the liquid and brought into effective contact with every part thereof, so that a uniform decolorizing action is secured.

The kieselguhr or diatomaceous earth which is to be used in producing the decolorizing composition, is reduced to a state of more or less fine division, being, for example, ground, or pulverized. Hydrogen dioxid in aqueous solution, preferably of a strength of about ten to twelve volumes of available oxygen per volume of liquid, is incorporated and absorbed in the ground kieselguhr, in such proportion that the hydrogen dioxid constitutes, say, one to ten per cent. of the total weight of the composition.

To decolorize a sugar solution, for example, beet sugar juice, the decolorizing composition above described is introduced into the juice, preferably while the latter is cool, for example at a temperature of about 65° C. and is stirred into the juice, so as to distribute it uniformly throughout the juice. The juice is then preferably heated, say to 95° C., and the hydrogen dioxid contained in or carried by the kieselguhr particles then reacts rapidly on the juice in such manner as to oxidize the coloring matter and decolorize the liquid, and as such kieselguhr particles are distributed throughout the liquid, the decolorizing action takes place uniformly throughout the liquid. The decolorized liquid is then filtered or strained from the liquid in any suitable manner. I have found that by this method of decolorizing sugar juice it is possible to remove 95 per cent. of all color, increase the purity one to five points, reduce the viscosity 75 per cent. and improve greatly the flavor of the syrup. Furthermore, this decolorization is secured without any reduction or inversion of the sugar. The operation of this method also reduces the percentage of molasses and eliminates viscous organic substances, thus facilitating crystallization.

The method of decolorizing above described in connection with beet sugar, is also applicable to cane sugar and to glucose, and to other liquids, such as oils, fats, etc., suitable modifications as to temperature, etc., being made where necessary.

When the hydrogen dioxid is absorbed in kieselguhr, in the manner above described, it is protected from deteriorating influences, and maintains its effectiveness for a comparatively long time.

What I claim is:

1. The method of decolorizing liquids containing oxidizable coloring matter, which consists in mixing with such a liquid a composition comprising hydrogen dioxid absorbed in kieselguhr.

2. The method of decolorizing a liquid containing oxidizable coloring matter, which consists in mixing with such liquid, while in a cool condition, a composition consisting of hydrogen dioxid absorbed in finely divided kieselguhr, and then heating the liquid.

FREDERICK RICHARD BACHLER.

Witnesses:
A. W. KRIEGER,
WILLIAM DIETERLE.